May 20, 1924. 1,495,122

H. M. VICKERY

BUMPER

Filed Sept. 17, 1923   2 Sheets-Sheet 1

H. M. Vickery — INVENTOR

BY Victor J. Evans

ATTORNEY

WITNESS:

May 20, 1924.
H. M. VICKERY
BUMPER
Filed Sept. 17, 1923  2 Sheets-Sheet 2
1,495,122
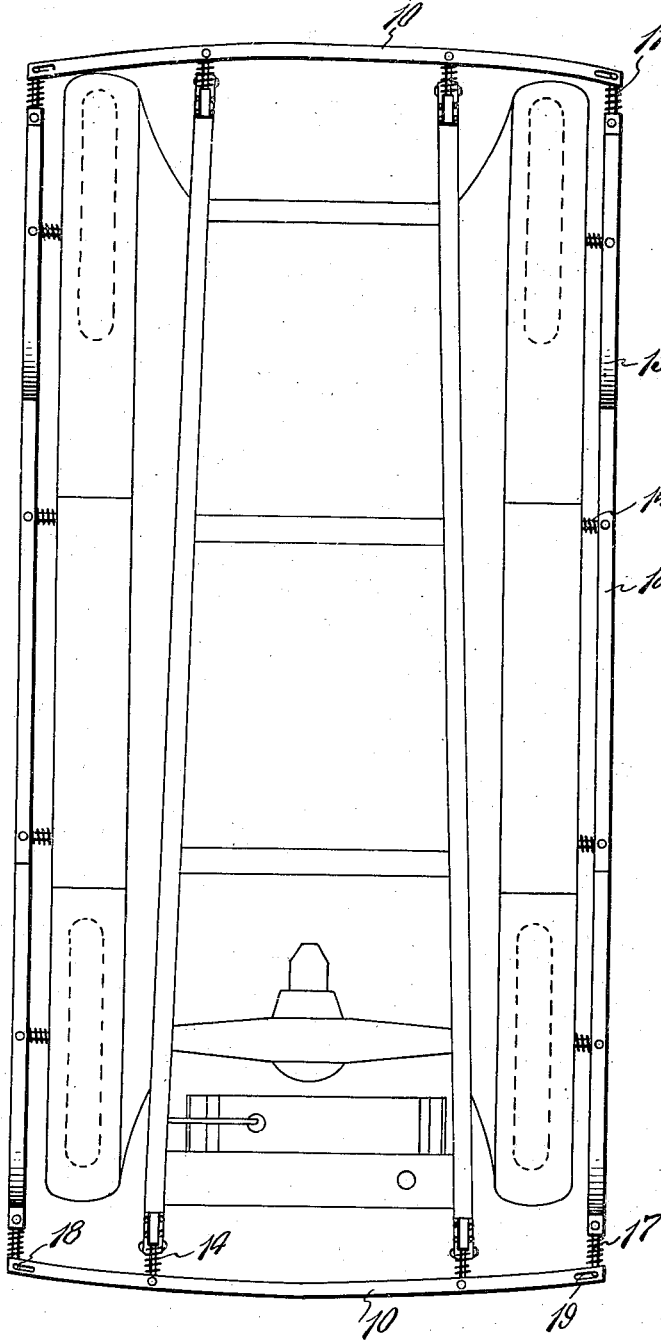
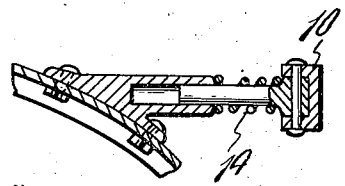
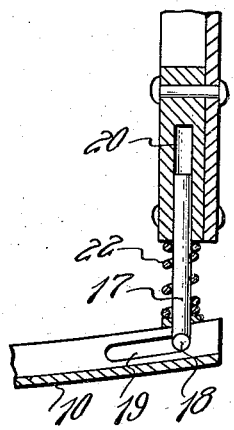
H. M. Vickery
INVENTOR
BY Victor J. Evans
ATTORNEY
WITNESS:

Patented May 20, 1924.

1,495,122

UNITED STATES PATENT OFFICE.

HENRY M. VICKERY, OF SAN DIEGO, CALIFORNIA.

BUMPER.

Application filed September 17, 1923. Serial No. 663,243.

*To all whom it may concern:*

Be it known that I, HENRY M. VICKERY, a citizen of the United States, residing at San Diego, in the county of San Diego and State of California, have invented new and useful Improvements in Bumpers, of which the following is a specification.

This invention relates to automobile bumpers, and contemplates certain improvements over the structure shown in my allowed application, bearing Serial Number 619,433, filed February 16, 1923, the present invention residing in the construction, and arrangement of parts as claimed.

In the drawings forming part of this application, like numerals of reference indicate similar parts in the several views, and wherein:

Figure 2 is a top plan view of the vehicle.

Figure 3 is an enlarged view of the connection between the adjacent ends of the side and end bumpers of the vehicle.

Figure 5 is a detail sectional view of the connection between the side bumpers and the fenders of the vehicle.

Figure 1:
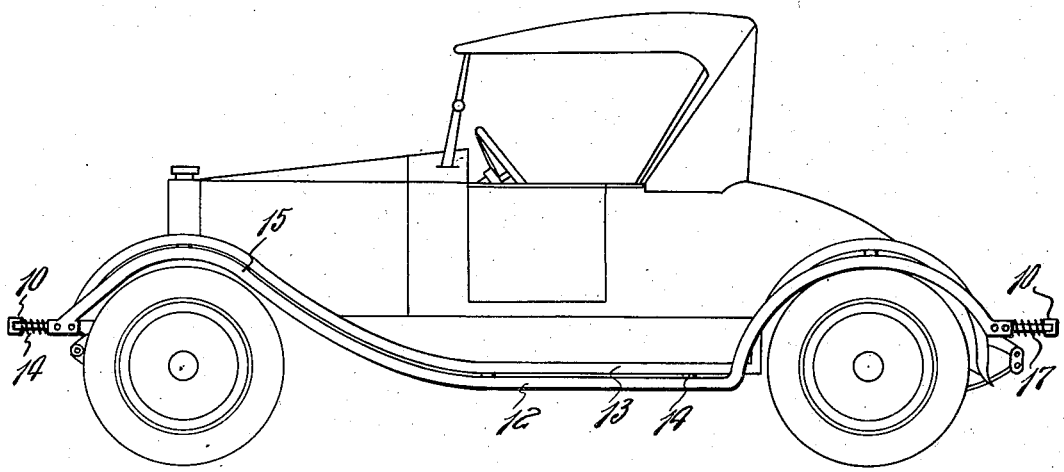
Figure 1 is a side elevation of a motor vehicle showing the improved bumper attached thereto.
Figure 4:
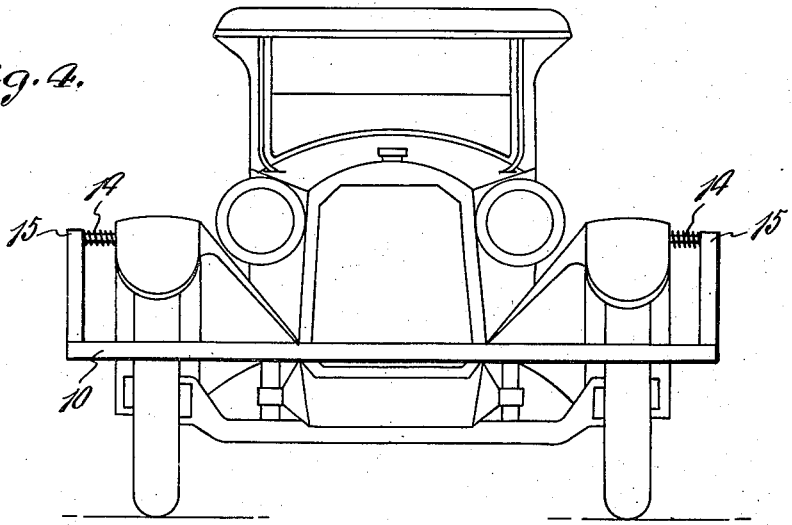
Figure 4 is a view of a front end elevation of a motor vehicle showing the invention.

Referring to the drawings in detail, 10 indicates the front and rear bumpers of any well known construction which may also be mounted upon the frame of the vehicle in any suitable manner. The yieldable connection however indicated at 11 is preferably employed to absorb shocks and jars which would otherwise be transmitted to the frame of the vehicle by contact of either bumper with an object while the machine is in motion. In accordance with the present invention, I make use of the side bumpers which as clearly illustrated in Figure 2 are arranged at the opposite sides of the vehicle and terminally connected with the adjacent ends of the bumpers 10. Each of the side bumpers include an intermediate straight portion 12 which is of a length substantially equal to the length of the running board 13, to which the side bumpers are connected by means of a yieldable connection 14, similar in construction to the yieldable connection 11 above referred to. In addition to the straight intermediate portion 12, each side bumper includes curved end portions 15 which are shaped to conform to the curvature of the adjacent fender of the vehicle, to lie immediately at one side of the fender for the purpose of protecting the latter from injury under any and all conditions and circumstances. Of course, the curved portion at the front of the bumper will be somewhat different in configuration than the curved portion at the rear of the bumper, inasmuch as the front and rear fenders of the vehicle are not of the same shape, and that the curved portions of course must be designed to harmonize with the curvature of the particular fender of the vehicle which it is adapted to protect. The curved portions of each side bumper are also connected with the adjacent fender by a yieldable connection 14, similar to the connection above referred to which associates the bumper with the running board of the vehicle.

The adjacent ends of the bumper 10 and side bumpers above described are yieldably connected together in the manner shown in Figure 3, so that any one bumper can yield or move with relation to the other bumpers. While this yieldable connection may be of any preferred form, I preferably make use of a key shaped connecting rod, the stem of which is indicated at 17 and the cross head at 18. The cross head 18 is received by a slot 19 formed in the end of the adjacent cross bumper 10, while the stem of each rod slides in a bore formed in a bracket 20 which is secured to the adjacent side bumper. A coiled spring 22 surrounds the stem of this rod and is interposed between the ends of the adjacent bumpers as clearly shown in Figure 3.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. In combination with a motor operated vehicle, a bumper connected with each end thereof, a bumper positioned at each side of the vehicle and yieldably connected with the running board and adjacent fenders of the vehicle, and a yieldable connection between the adjacent ends of the side and end bumpers.

2. In combination with a motor operated vehicle, a bumper connected with each end thereof and having slots adjacent their extremities, bumpers arranged at the sides of the vehicle and yieldably connected with the running board and adjacent fenders of the vehicle, a bracket carried by each side bumper, a substantially T-shaped rod slidable in said bracket, with the head of said rod received by the slot of the adjacent end bumper, and a coiled spring interposed between said bumpers, whereby all of the bumpers are yieldably connected together at the ends thereof.

3. In combination with a motor operated vehicle, a bumper connected with each end thereof, a bumper arranged at each side thereof, each side bumper including an intermediate straight portion coextensive in their length with the adjacent running board, a yieldable connection between said intermediate straight portion and said running board, each side bumper also including curved end portions shaped to conform to the curvature of the adjacent fenders of the vehicle, and yieldable connections between the curved portions and said fenders.

In testimony whereof I affix my signature.

HENRY M. VICKERY.